United States Patent
Kesil et al.

(10) Patent No.: US 6,900,451 B2
(45) Date of Patent: May 31, 2005

(54) MAPPING SENSOR SYSTEM FOR DETECTING POSITIONS OF FLAT OBJECTS

(75) Inventors: Boris Kesil, San Jose, CA (US); David Margulis, Campbell, CA (US); Elik Gershenzon, Daly, CA (US)

(73) Assignee: Multimextrixs, LLC, Santa Clara, CA (US)

( * ) Notice: Subject to any disclaimer, the term of this patent is extended or adjusted under 35 U.S.C. 154(b) by 0 days.

(21) Appl. No.: 10/007,265

(22) Filed: Nov. 8, 2001

(65) Prior Publication Data

US 2003/0085368 A1 May 8, 2003

(51) Int. Cl.$^7$ .............................................. G01N 21/86
(52) U.S. Cl. ............................ 250/559.36; 250/559.12
(58) Field of Search ..................... 250/559.36, 559.33, 250/559.29, 559.3, 559.37, 559.4, 559.12; 414/935–941; 356/614, 400

(56) References Cited

U.S. PATENT DOCUMENTS 6,130,437 A * 10/2000 Cerny et al. ............. 250/559.4

* cited by examiner

Primary Examiner—Thanh X. Luu (57) ABSTRACT

The mapping sensor system of the invention is intended for use with a mechanical arm of an industrial robot which loads and unloads flat circular objects, such as semiconductor wafers, into and from wafer cassettes on operations of processing the semiconductor wafers in stand-alone or cluster machines used in semiconductor production. The mapping system consists of a light source, a light-receiving element, and a light beam shaper. The light source is installed on the front end of the robot arm and directs the light via the beam shaper to the leading edge of the semiconductor wafer. The beam reflected from the wafer edge is sensed by a light-receiving element, such as a photodiode. The shaper modifies the shape and the cross-section of the beam directed towards the wafer so as to provide reflection from the curvilinear surface of the edge, irrespective of the existence of the notch, most optimum for detection by the photodiodes and without generation of false signals. In one embodiment, the beam shaper contains a special objective with a cylindrical lens. In another embodiment, the beam shaper comprises an anamorphotic objective with an array of microlenses.

14 Claims, 6 Drawing Sheets

MAPPING SENSOR SYSTEM FOR DETECTING POSITIONS OF FLAT OBJECTS

FIELD OF THE INVENTION

The present invention relates to a mapping sensor system for detecting positions of flat objects, in particular for mapping positions of semiconductor wafers in the slots of wafer cassettes, or the like. The mapping sensor system of the invention is intended for use in conjunction with operation of a mechanical arm of an industrial robot, in particular for loading/unloading semiconductor wafers to/from operation positions on semiconductor manufacturing machines.

BACKGROUND OF THE INVENTION

In semiconductor industry, treatment of semiconductor wafers is always accompanied by operations of transfer and positioning of such wafers between the storage devices, such as wafer cassettes, and working stations of processing machines.

In the case of a stand-alone machine, manipulation with the wafers normally consists in transferring a wafer from one cassette to the stand-alone machine with the subsequent transfer of the treated wafer from the machine to another cassette. In some cases, after treatment in the stand-alone machine, the treated semiconductor wafers are returned to the slots of the same cassette. Such an operation is associated with a more complicated mapping procedure than in the case of two cassettes. This is because in the second case the sensor system of the robot has to detect and remember all Z-positions and thicknesses of the wafers in the slots of the cassette which are filled with the wafers and which are free for insertion of the treated wafers. The same situation occurs in the case of treating the wafers in cluster machines with the difference that the robot arm manipulates the wafers between working stations of the cluster machine and a single or several cassettes.

Semiconductor wafers are generally racked or mounted vertically on their edges and stacked horizontally in plastic cassette carriers. Each carrier contains many parts next to each other with a small separation between each part. Detecting the edge of a wafer or disk permits accurate positioning information to be obtained allowing automated handling equipment to access and remove individual parts for processing without damaging adjacent parts in the carrier.

The wafer processing machines are equipped with special sensors, known as mapping sensors, which detect improperly aligned parts, missing parts, double-wafers or double-disks (i.e., wafers or disks mounted with no spaces between them) alerting the technician or automated equipment to possible defective parts, or to pass over the defective parts to prevent further processing. However, sensing of the extremely thin, compoundly curved edges of semiconductor wafers has, until now, represented a significant challenge in developing edge sensing devices capable of rapidly and accurately sensing these edges.

Sensing devices currently being used to detect semiconductor wafers include a "through beam", which is a beam that is emitted from a light source to a light-receiving element of the sensor and is interrupted or blocked by a peripheral edge of the wafer when it is transferred from one operation position to another. However, the through-beam type sensors are difficult to align and, generally, must be dedicated to a cassette for specific parts. Further, the through beam is unable to detect "double-stacking"; i.e., where two wafers or disks have inadvertently been mounted in the parts carrier so that their adjacent faces are in contact. Double stacking invariably causes defects, such as scratches, on the precision surfaces of these products resulting in lower process yields and increased costs due to rejected parts. Ideally, early detection of double stacking is desirable to prevent further costly processing of these defective parts and to help identify which process step is the cause of the double stacking.

Through-beam detection of parts will not be able to identify double-stacked or cross-slotted parts in those carriers where the parts are tilted or slightly askew in their slots. As semiconductor wafers are very thin and the slot in the carrier is generally of a design that does not support the wafer equally around its circumference, the wafer will sit slightly tilted in that slot. The tilted wafer or disk presents a wider profile to the through-beam than that of a perfectly aligned wafer. This wider profile may be mistakenly interpreted by the through-beam system as a double stacking occurrence.

Another process-related error, which may result in product defects, is "cross-slotting." Cross slotting occurs when a semiconductor wafer or magnetic disk is positioned in the parts carrier such that one edge of the wafer or disk in contact with the carrier is in the wrong retaining slot in the carrier.

Some systems for detecting positions of wafers in the cassettes are based on the use of so-called proximity sensors, which involve the use of a fiber optic light guide, brought in close proximity to the position where the perimeter edge of the part is anticipated to be. These stackers require precise alignment for docking into a receiving bay. The fiber optic sensor directs light towards the anticipated location of the perimeter edge of the top disk in the stacker. The fiber optic sensor detects the presence of the top wafer in the stacker by receiving the reflected light back into the fiber optic cable with the reflected light being sensed by an optical sensor. However, this system requires that the terminal end of the fiber optic cable be in extreme close proximity to the edge of the top wafer and that the incident light from the optic cable impinge at a 90° angle to the tangential surface of the edge of the wafer. In addition, the edge of the wafer must be thick enough so as to present as flat a surface as possible to the fiber optic light in order to provide enough surface to reflect back a sufficient amount of light to trigger the sensor. Thinner wafers having a compoundly curved edge will not reflect sufficient light directly back to the fiber cable and, therefore, the sensor will not detect the disk. In order to maintain such close proximity, the sensor is rigidly affixed to either the stacker or the receiving bay, thus precluding its use for rapid parts counting. This unreliability could result in process throughput deterioration because the fiber optic sensor erroneously senses there are no more parts to process causing the process to stop. Alternately, the stacker may continue indexing upward despite the top wafer not having been sensed and removed causing a "double-wafer" to occur as the unsensed wafers falls back onto the next wafer being indexed. In either case, such unreliability will require that an operator or technician be present to continually monitor production processes, thus negating the reasons for installing automated parts handling. This scheme is further limiting since the close proximity and the 90° angle of incidence required by the device precludes rapid scanning across the length of the carrier for a rapid parts count.

The problems inherent in through-beam sensors and in proximity sensors were partially solved by the device and method described in U.S. Pat. No. 5,504,345 issued in 1996 to H. Bartunek, et al. The Bartunek, et al. device provides a wafer edge detection system having a converging dual-beam optical sensor for detecting the presence of small, specular surfaces, particularly small radius curved surfaces. The sensor comprises at least two light sources, preferably lasers, and at least two light detectors. Alternately, a single light source with its light beam passed through the appropriate optics may have its beam split to create at least two light beams. Further, a single light detector may be used together with the appropriate optics such that the reflected light is directed by the optics to the light detector. The light sources, or alternately light beams emanating from a light source, are spatially oriented such that the focal point of the converging light beams defines a focal or inspection plane and converges at a single point external to the device. When the specular or reflective surface to be detected interrupts the beam at or near the focal point of the light sources, it causes the light to be reflected backwards towards the sensor for direct detection by the light detectors or for indirect detection where the appropriate optics direct the reflected light to at least one light detector. The light detectors, or the optical path for indirect detection, are spatially arranged to permit detection of the reflected light even though the surface to be detected is curved or presents a reflecting angle, or angle of incidence, deviating significantly from 90°.

However, the device of Bartunek et al. does not solve some other problems associated with the use of known mapping sensors. One unsolved problem consists in generation of false signals, e.g., when the sensor generates a signal that the cassette slot is occupied, while it is free. This problem is associated with the loss of a valuable and expensive time of a working cycle. Another more serious problem occurs in generation of a signal stating that the cassette slot is free while it is occupied by another wafer. Such false signal may cause serious damage to the equipment by inserting an expensive treated wafer into the occupied slot of the cassette. This operation may result in a crush or even in more serious and expensive damage. Another general problem in connection with the use of known mapping sensors consists in that, in order to provide reliable operation of the sensors, it is necessary to in crease the power of laser light sources to the level unacceptable for operation in open spaces where the exposed laser light becomes dangerous for the operator. In other words, the intensity of the laser light becomes higher than the sanitary norms specified by respective FDA standards. Increase in the power of laser light sources is associated not only with hazard to the operator's health but also with intensification of light reflected from the inner walls of the cassette, which results in generation of many false signal. Some of these intensified false signals may reach or even exceed the level of sensitivity of the mapping sensor, which in this case generates a false signal. A third problem consists in that practically all conventional mapping sensors used in the semiconductor production field operate with difractionally-limited light beams having transverse dimensions comparable with the width of a notch on a disk. It is known that almost all wafers used at the present time are provided with small V-shaped cutout portions (hereinafter "notches"). When the beam of the mapping sensor with a narrow cross-section coincides with the position of the notch, it may generate the aforementioned false signal of the type indicating that the cassette slot is free. This is because the beam reflected from the surface of the notch may have a direction different from the one reflected from the peripheral edge of the wafer, or may have intensity of light signal below the threshold of the sensor.

Figure 1A:
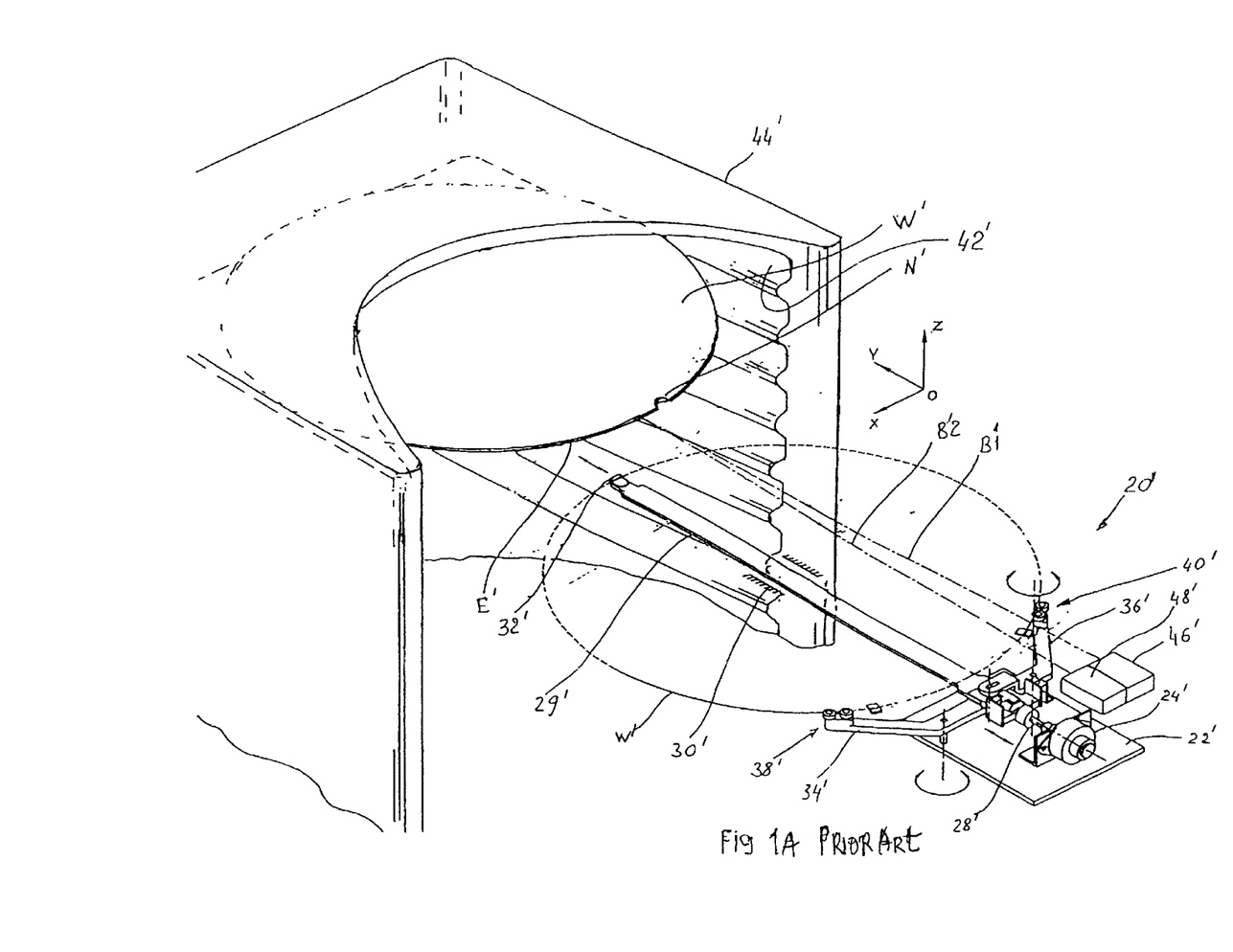
FIG. 1A is a schematic three-dimensional view of an end effector with a known mapping sensor system.

Another mapping sensor system is described in U.S. patent application Ser. No. 09/944,605 filed by the same applicants on Sep. 4, 2001. This known mapping system is shown in FIG. 1A, which is a schematic three-dimensional view of a mapping sensor system in conjunction with an end effector of a mechanical robot. As shown in FIG. 1A, the end effector 20' has a mounting plate 22' attached to a robot arm (not shown). The plate 22' supports a stepper motor 24'. The output shaft 28' of the stepper motor 24' is connected through a spring (not shown) to an elongated finger 29' that slides in a central longitudinal slot 30' of the plate 22' and supports a first wafer gripping post 32', pivotally supports two L-shaped fingers 34' and 36' with a second and third wafer gripping posts 38' and 40' on their respective ends. The mounting plate 22' in combination with the first sliding finger 29' and two pivotal fingers 34' and 36' forms the end effector of the robot arm which is thin enough for insertion into a wafer-holding slot 42' of a wafer cassette 44'. It is understood that the aforementioned end effector was shown only as an example, and that this can be a wafer-handling system for operation with the wafer cassette that stores circular wafers W' in narrow slots.

In the system of FIG. 1A, the mapping system consists of a light source 46' such as a laser diode and a light-receiving element such a photodiode 48'. The laser diode 46' may be of ML1016R-01 type produced by Mitsubishi Electric Corp., Japan. The light beam B'1 generated by the laser diode 46' is focused on the wafer edge with the use of a special objective or a spherical lens (not shown) which produces a beam of a round cross section. The photodiode 48' may of a conventional type, which is sensitive to the light of laser diode reflected from the peripheral edge E' of the wafer W'. The wafer W' has a notch N' or flat on its peripheral edge E'. It can be seen that the mapping system is mounted on the plate 22' in front of the cassette 44' which is convenient for mapping of the wafer positions in the cassette 44'.

In operation, the light source 46' emits a light beam B'1 which is focused on the edge E' of the wafer W', e.g., in the slot 42' of the cassette 44'. If the wafer W' is present in the slot 42', the beam B'2 reflected from the edge E' of the wafer W' is sensed by the photodiode 48'. The latter produces on its output a signal sent to the control unit (not shown) of the end effector 20'. However, the mapping system of FIG. 1A with a single beam B'1 focused on the edge E' will not produce a signal if the beam B'1 falls onto the notch N'.

OBJECTS AND SUMMARY OF THE INVENTION

It is an object of the present invention to provide a mapping sensor system for detecting, memorizing positions of flat objects, and controlling movements of the robot arm. Another object is to provide the mapping sensor system of the aforementioned type which is reliable in operation, not sensitive to false signals, distinctly differentiates between empty and occupied slots of wafer cassettes, operates irrespective of the position of a notch or flat on the periphery of the semiconductor wafer, detects double-stacked and inclined wafer in the cassette, can operate with low-power laser light sources and hence without the use of intensified light signals dangerous for operator's health. It is another object to provide a mapping sensor system of the aforementioned type, which operates with profiled light beams specifically modified for reflection from curvilinear peripheral edge of the wafer. Still another object is to provide a method for mapping flat objects located in slots of a cassette.

The mapping sensor system of the invention is intended for use with a mechanical arm of an industrial robot which loads and unloads flat circular objects, such as semiconductor wafers or glass substrates, into and from wafer cassettes on operations of processing the semiconductor wafers in stand-alone or cluster machines used in semiconductor production. The mapping system consists of a light source, a light-receiving unit, and a light beam shaper. The light source is installed on the front end of the robot arm and directs the light via the beam shaper to the leading edge of the semiconductor wafer. The beam reflected from the wafer edge is sensed by a light-receiving element, such as a photodiode receiver. The purpose of the shaper is to modify the shape and the cross-section of the beam directed towards the wafer so as to provide reflection from the curvilinear surface of the edge, irrespective of the existence of the notch or flat, most optimum for detection by the photodiode receivers and without generation of false signals, Another object is to increase the part of light reflected from the edge of the wafer. Still another purpose of the shaper is to transform a converging or pointed beam of high intensity into a spatially distributed beam of low intensity allowable for exposure to the operator. In one embodiment, the above objective is achieved by means of a special objective that contains a cylindrical lens. In another embodiment, the objective is achieved by utilizing an array of special microlenses which convert a single beam from a single light source into a plurality of beams modified in compliance with the point of incidence of the modified beams onto the wafer edge.

DETAILED DESCRIPTION OF THE INVENTION

Figure 1B:
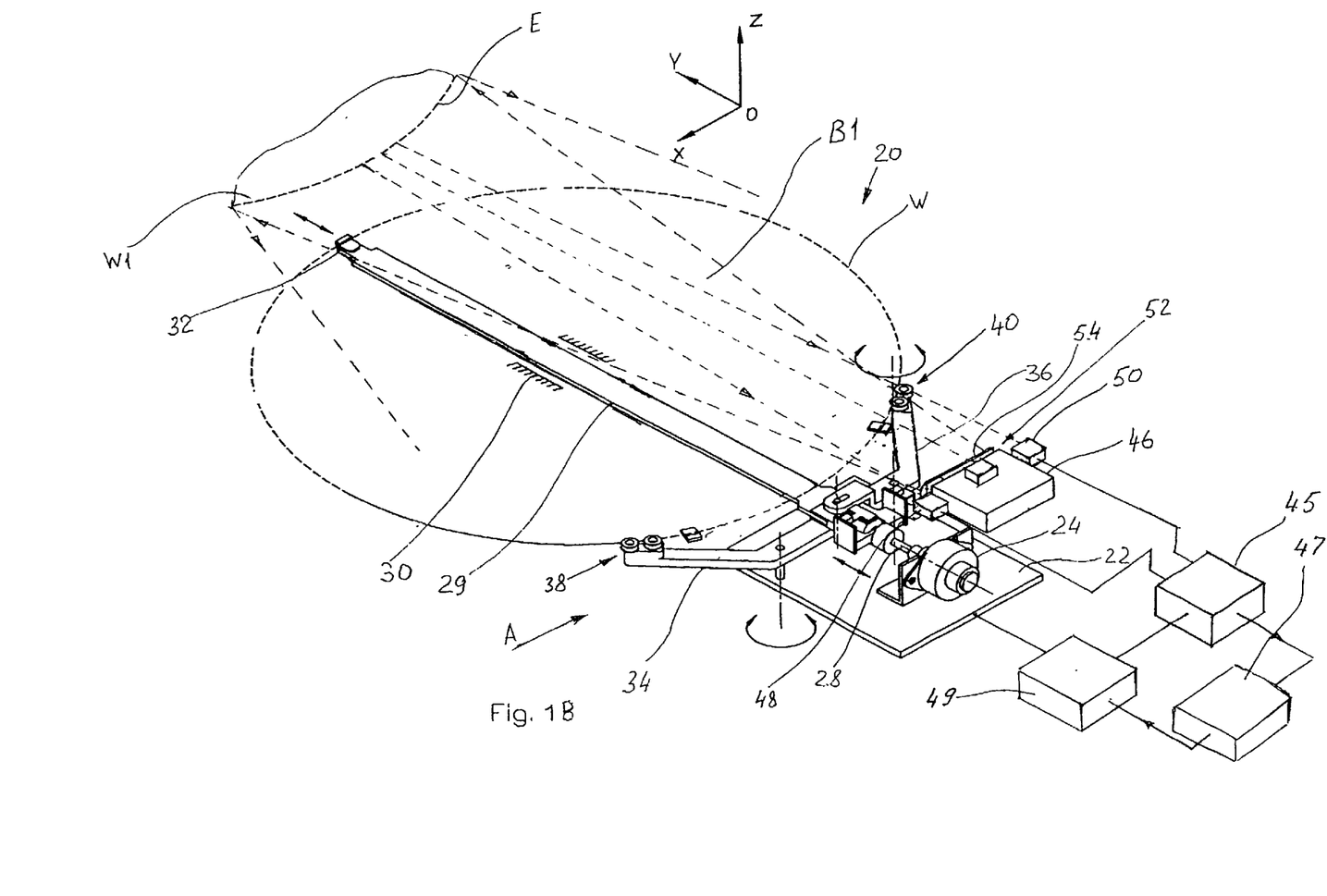
FIG. 1B is a schematic three-dimensional view of an end effector with a mapping sensor system in accordance with one embodiment of the invention.

"The mapping sensor system of the present invention in conjuntion with a semiconductor wafer end effector, is shown in FIG. 1B which is a schematic three-dimensional view of the system" with the following—The mapping sensor system of the present invention in conjunction with an actuating mechanism, e.g., semiconductor wafer end effector, is shown in FIG. 1B which is a schematic three-dimensional view of the system.

The precision soft-touch gripping mechanism or end effector 20, which is used in conjunction with the mapping system of the invention has a mounting plate 22 attached to a robot arm (not shown). The plate 22 supports a stepper motor 24. The output shaft 28 of the stepper motor 24 is connected through a spring (not shown) to an elongated finger 29 that slides in a central longitudinal slot 30 of the plate 22 and supports a first wafer gripping post 32, pivotally supports two L-shaped fingers 34 and 36 with a second and third wafer gripping posts 38 and 40 on their respective ends. The mounting plate 22 in combination with the first sliding finger 29 and two pivotal fingers 34 and 36 forms the end effector of the robot arm which is thin enough for insertion into a wafer-holding slot of a wafer cassette. It is understood that the aforementioned end effector was shown only as an example, and that this can be a vacuum-type wafer-handling system for operation with the wafer cassette that stores circular wafers W in narrow slots.

Along with other sensors, which are beyond the scope of the present invention and description of which is therefore omitted, the end effector 20 is provided with a mapping sensor system. In the embodiment of the invention shown in FIG. 1B, the mapping system consists of a light source 46 such as a laser diode, light-receiving elements such as photodiode 48 and 50, and a light beam shaper 52.

Figure 2:
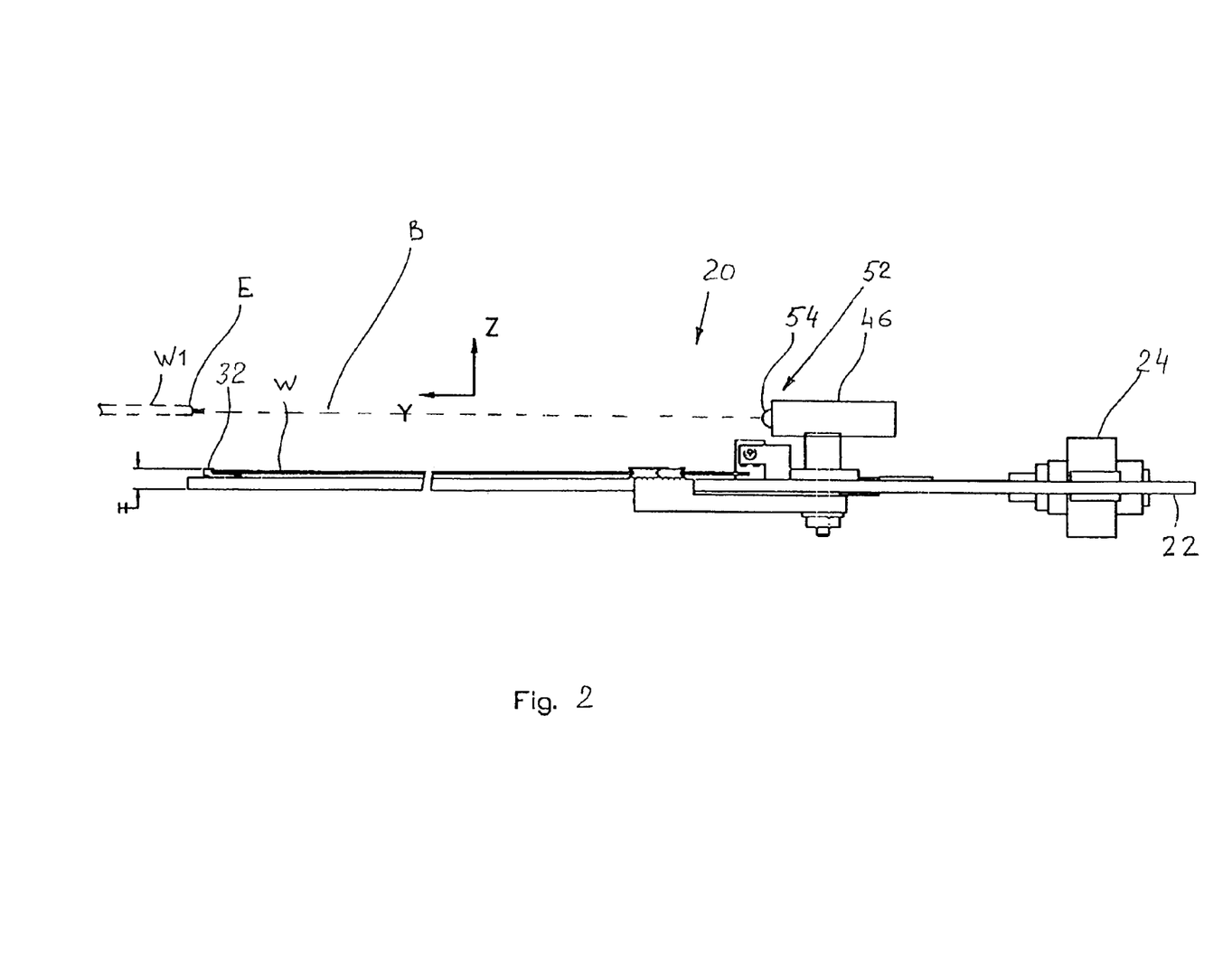
FIG. 2 is a side view of the system of FIG. 1B in the direction of arrow A.

The laser diode 46 may be of ML 1016R-01 produced by Mitsubishi Electric Corp. The photodiode 50 may of a conventional type, which is sensitive to the light of laser diode reflected from the edge E of the wafer W. In the embodiment of FIGS. 1B and 2, the beam shaper 52 comprises an objective, which is attached to the mounting plate 22 in front of the light source 46 and consists of a cylindrical line-generating lens 54 which broadens the light beam B into a wide and narrow cross section of the type shown in FIG. 3. The cylindrical line-generating lens 54 can be selected so that the transverse dimension "t" of the beam B (which is a distance between two symmetrically opposite points L1 and L2 in the cross section of the beam perpendicular to the beam direction where the light intensity is 50% of the maximal intensity) is approximately twice the thickness "T" of the wafer W.

All optical elements of the mapping system of this embodiment, i.e., the light source 46, beam shaper 52, and photodiodes 48 and 50 can be assembled into a common housing (not shown).

Figure 3:
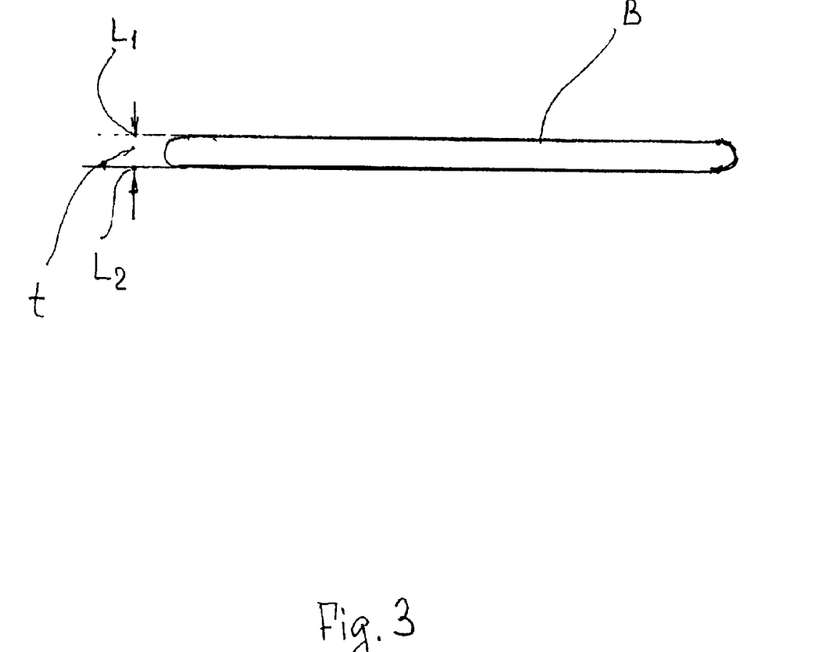
FIG. 3 is a cross section of the light beam along the line III—III of FIG. 1.

It can be seen from FIG. 3, that the cross section of the beam B has a shape of an ellipse with a large ratio of a long semi-axis to a short semi-axis. In approximation such a cross section can be considered as a strip. This is because the cylindrical lens 54 functions as a beam diverging element, which increases the divergence angle of the beam. The aforementioned strip-like configuration of the beam cross section is advantageous for the system of the invention in that the beam B is distributed over a larger surface on the edge E of the wafer W than in the case of a diffractionally limited beam generated by conventional spherical lenses used in all known mapping sensor systems. Therefore the intensity of light incident on the surface of the edge E will be lower than in the case of a spherical lens that produces the aforementioned diffractionally limited beam which is focused on the wafer edge E. This is important from the point of view of safety for personnel working with laser technique and of reliability of detection of the reflected light.

Such a result would not be achieved with the use of conventional spherical lenses that generate diverging beams. This is because the light that passed through the light-diverging spherical lenses and reflected from the wafer edge W to the photodiodes 48 and 50 would be too weak as compared to the intensity of light generated by the light source 46. In other words, in the case of the mapping system shown in FIGS. 1–3, decrease in the intensity of light reflected from the wafer edge E and sensed by the photodiodes 48 and 50 will be proportional to the length of the optical path from the light source 46 to the light-receiving elements 48 and 50, wherein in the case of conventional diffractionally limited spherical lenses the decrease in the intensity of light will be proportional to the aforementioned optical path in the power of two. It would be much more difficult to control and adjust the intensity of the light on the light receiving side in the case of a spherical lens than in the case of a cylindrical lens. In other words, the use of a cylindrical lens 54 makes it possible to adjust the light beam intensity in such a way that the light reflected from the wafer edge E will be lower than the maximum intensity of laser light allowed by sanitary norms for exposure to the personnel, but higher than the sensitivity threshold of the photodetectors 48 and 50 for sensing the light reflected from the wafer W. At the same time, any other light beams reflected from the inner walls of the cassette 44, as well as the parasitic beams formed after multiple reflections will have intensity lower than the sensitivity threshold of the photodiodes 48 and 50.

The system of FIGS. 1B, 2, and 3 operates as follows. When the end effector 20 moves, e.g., in a vertical direction from the upper end of the wafer cassette 44 to the lower end of this cassette, the sensor system of the invention performs so called mapping operation. This operation consists in that the light beam B, which has a substantially flat configuration parallel to the planes of the wafers W in the cassette 44, propagates towards the slots of the cassette 44. If the wafer W is absent in a certain slot, the beam B will partially pass through transparent walls of the cassette and partially will be reflected from the walls of the cassette 44 so that the intensity of the reflected light incident on the photodides 48 and 50 will always be below the sensitivity threshold of the photodiode 48 and 50. If, on the other hand, the wafer W is present in the slot of the cassette 44, the outer cylindrical surface of the wafer edge E, which has a width comparable with the thickness of the flat beam B, will reflect almost the entire beam incident on this edge E. The light reflected from this edge, will have intensity above the sensitivity threshold of the photodiode 48 and 50.

In FIG. 1B, reference numeral 45 designates a memory unit which receives and memorize the mapping signals from the photodiodes 48 and 50. The output of the memory unit 45 is connected to the input of a data processing unit 47, e.g., a microprocessor, which, in turn, controls operation of a control unit 49 of the end effector 20.

Thus, on the way across the open side of the cassette, the optical mapping system will detect and memorize in a memory unit 45 (FIG. 1B) the mapping signals sent from the photodiodes 48 and 50. These signals will be processed in the data processing unit 47 and the processed signals will be transmitted to the control unit 49 of the end effector 20. In response to these signals, the end effector 20 will either grip or release the respective wafer. The operation of the system can be carried out in another mode, in which the mapping data about all the wafers located in different slots are collected in the memory unit in advance prior to manipulation with the wafers, and then the wafer handling operations are performed.

Due to the fact that beam shaper 53 imparts to the beam B1 the shape of a strip the projection of which onto the edge E is much wider than the width of the notch N of the wafer W (FIG. 1B), the notch will always be overlapped and therefore will never affect the operation of the mapping system. The strip-like beam also solves problems of reliability in detecting light reflected from wafers with deep-blue nitride coatings, as well as from other low-reflective wafers with an increase of the sensing distance up to 20 inches. Due to increase in the sensing distance, it becomes possible to arrange the sensor slightly above and behind position of the wafer in the end effector and to combine operation of wafer handling by the robot arm with the procedure. This, in turn, excludes additional operations associated with orientation and positioning of the sensor with respect to the cassette slots and to shorten the operation cycle with an increase in throughput of the wafer-handling procedures by about 30%.

Figure 4:
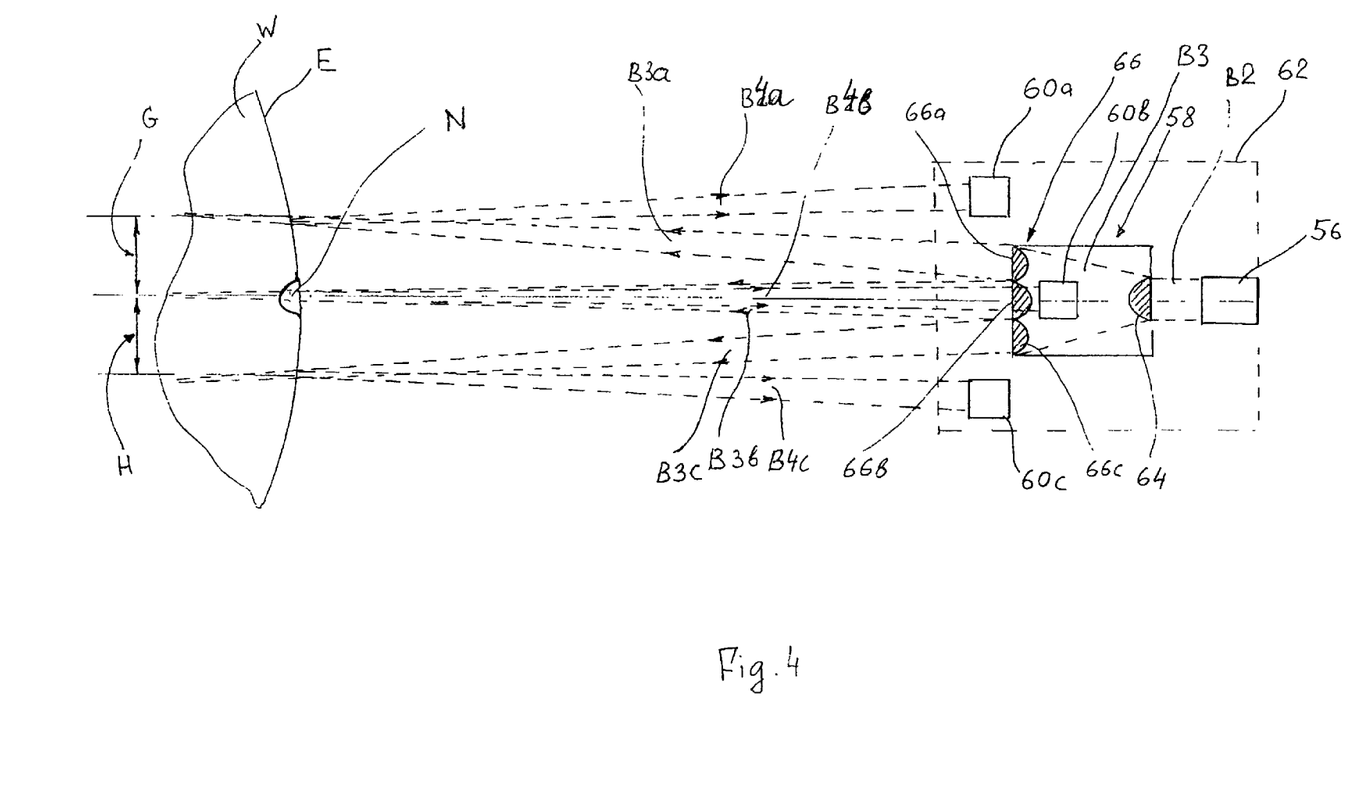
FIG. 4 is a schematic plan view of a mapping sensor system in accordance with another embodiment of the invention.

The above objective, i.e., decrease in the intensity of the exposed light with simultaneous increase of intensity of the light on the photodiodes and filtering of false signals, can also be achieved with a system of FIG. 4 that corresponds to the second embodiment of the invention. The system of this embodiment consists of a single light source 56, such as a laser diode unit, and a light beam shaping unit 58, and a plurality of light-receiving elements 60$a$, 60$b$, . . . 60$n$ such as photodiodes. All optical elements of the mapping system, i.e., the light source 56, beam shaper 58, and photodiodes 60$a$, 60$b$, . . . 60$n$ can be assembled into a common housing 62 shown in FIG. 4 by broken lines. This housing is installed on the mounting plate 22 of the end effector, such as the one shown in FIG. 1B by reference numeral 20.

The beam shaper comprises an anamorphotic objective consisting of a cylindrical lens 64 and microlens array 66 arranged on the optical path from the laser diode 56 and the edge E of the semiconductor wafer W. Although for simplicity of the drawing, the array 66 is shown consisting of three lenses 66$a$, 66$b$, and 66$c$, it is understood that the number of the lenses in the array can be different.

The end effector and the cassette arrangement used in connection with the embodiment of FIG. 4 are essentially the same as in the system of FIG. 1B. Therefore, in the description of operation of the embodiment of FIG. 4, reference will also be made to the end effector of FIG. 1B, assuming that the mapping system corresponds to FIG. 4.

The system of FIG. 4 operates as follows. When the end effector 20 (FIG. 1B) moves, e.g., in a vertical direction from the upper end of the wafer cassette to the lower end of this cassette, the sensor system of this embodiment (FIG. 4) of the invention performs the mapping operation. More specifically, the laser diode unit 56 forms a diffractionally limited beam B2 formed by means of a lens (not shown) built into the laser diode unit 56. Many laser-diode manufacturers produce the units with such feature as a commercial product. Beam B2 passes through the cylindrical lens 64 of the of the beam shaper 58, which transforms the beam B2 into a substantially flat beam B3 having a strip-like cross section. The beam B3 falls onto a microlens array 66 which splits the beam B3 into a plurality of individual beams B3$a$, B3$b$, and B3$c$, i.e., into three beams in the embodiment of FIG. 4.

Figure 5:
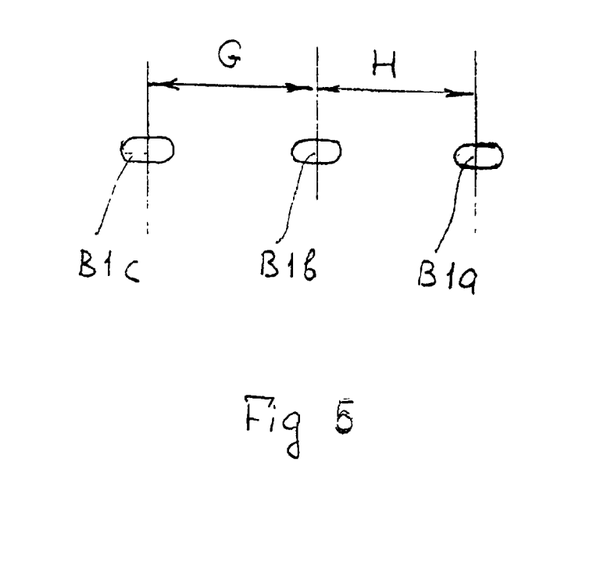
FIG. 5 is a fragmental plan view illustrating cross-sections of light beam near the wafer edge.

The anamorphotic objective consisting of the cylindrical lens 64 and the array of cylindrical microlenses 66$a$, 66$b$, and 66$c$, does not change the divergence of the beam B3 in the direction perpendicular to the plane of the wafer W. Therefore in the area of the wafer edge E the beams B3$a$, B3$b$, and B3$c$ will have the beam thickness comparable with the thickness of the wafer W. FIG. 5 shows cross-sections of the beams B3$a$, B3$b$, and B3$c$ in the vicinity of the wafer edge E. Curvature of the cylindrical lenses 66$a$, 66$b$, and 66$c$ is selected so that the transverse dimensions of the light spot formed by the beams B3$a$, B3$b$, and B3$c$ on the peripheral surface of the disk edge E are equal or slightly exceed the width of the notch N (FIG. 4).

In order to prevent excessive angle of reflection of the beams B4$a$, B4$b$, and B4$c$ reflected from the edge E towards photodiodes 60$a$, 60$b$, and 60$c$, respectively, the circumferential distances G and H (FIG. 5) should be on the order of the width of the notch. This is because of the circular configuration of the edge E, the reflected beams B4a and B4c may be spread to far apart. This will result in an increased distance between the photodiodes 60a and 60c and thus will increase the overall dimensions of the system.

If the wafer W is absent in a certain slot of the cassette 44 (FIG. 1B), the beams B4a, B4b, and B4c will partially pass through transparent walls of the cassette and partially will be reflected from the walls of the cassette. The intensity of light reflected from the walls of the cassette can be lower or higher than the sensitivity threshold of the photodiode 60a, 60b, 60c. If the aforementioned intensity is below the sensitivity threshold, the system naturally will not sense the wafer. If the intensity of the light reflected from the cassette walls exceeds the sensitivity threshold of the photodiodes, such a signal can be sensed by the photodiodes. However, if the intensity of the reflected signal exceeds sensitivity of the threshold but the wafer W is absent, this false signal will not be interpreted as the signal reflected from the edge E. This is because the beams reflected from the cassette walls will have random directivity, and at least two beams will practically never fall onto at least two photodiode simultaneously. Such a condition will occur only when the wafer is present in the respective slot of the cassette, since in this case the reflected beams B4a, B4b, and B4c will have strict directivity towards respective photodiodes 60a, 60b, and 60c.

Thus, on the way across the open side of the cassette, the optical mapping system of FIG. 4 will detect and memorize in a memory unit of the industrial robot (not shown in the drawings) the wafer-distribution map of the cassette.

If one of the beams accidentally falls on the notch, two other beams will be sensed, and this will be sufficient for detecting the wafer.

The system of FIG. 4 makes it possible to operate with low sensitivity thresholds and with the laser beams having intensities not hazardous for exposure to the personnel.

Figure 6:
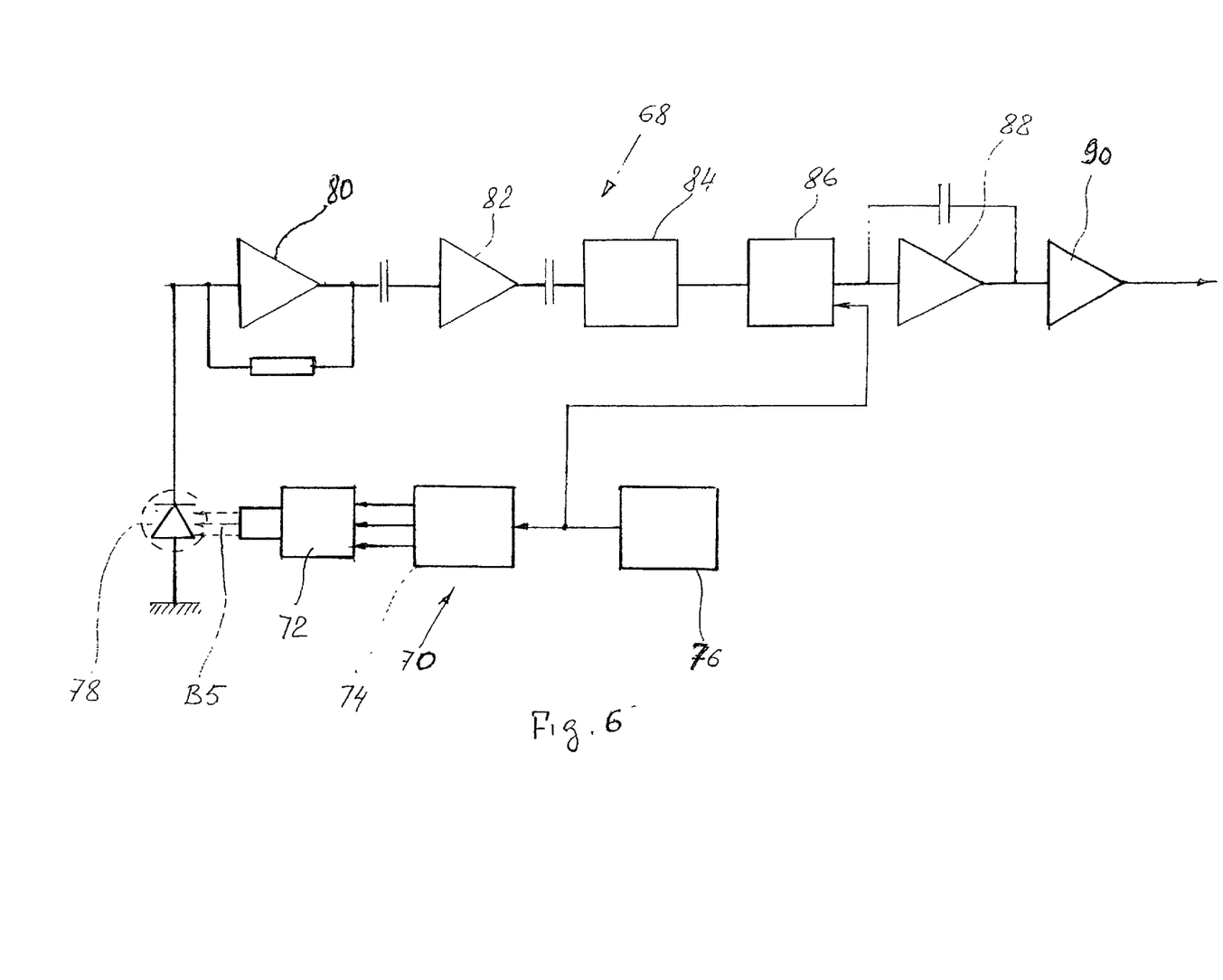
FIG. 6 is block diagram of an electronic signal-processing circuit of the mapping sensor.

FIG. 6 is block diagram of an electronic signal-processing circuit of the mapping sensor systems of FIG. 1B and FIG. 4. This circuit controls and defines the values of thresholds of photodiodes 48, 50 (FIG. 1B) and 60a, 60b, 60c (FIG. 4). The circuit of FIG. 6 is a so-called synchronous detection circuit for detection of weak optical signals. Incorporation of the principle of synchronous detection into the mapping system of the invention makes it possible to significantly increase the dynamic range of the system sensitivity and to adjust the values of the sensitivity thresholds in photodiodes 48, 50 (FIG. 1B) and 60a, 60b, 60c (FIG. 4) for screen out false signals.

As shown in FIG. 6, the circuit consists of two channels, i.e., a photoreceiver channel 68 (although only one such channel is shown, the number of these channels corresponds to the number of photodiodes, i.e., three in FIG. 4) and a phototransmitting channel 70. The photoreceiving channel consists of a laser diode 72 which generates a beam B5, a laser-diode driver 74, and a modulator 76 intended for modulating radiation of the laser diode with the use of current. The photoreceiver channel 68 consists of the following elements connected in series: a photodiode 78, a photoamplifier 80, a photoamplifier electrical signal limiter 82, a band pass filter 84 which limits the bandwidth of the operation frequencies, a demodulator 86, an integrator 88, and a comparator 90. A signal from the modulator 76 of the phototransmitting channel 70 is sent to the input of the demodulator 86 of the photoreceiver channel 68 and thus sets the demodulation frequency.

It is understood that in such a circuit, useful signals are received on the modulation frequency and in a narrow band of the modulation frequency. It is known that the circuits of the type shown in FIG. 6 are characterized by increased sensitivity, improved signal-to-noise ration, and a high dynamic range of sensitivity of the useful signal.

Thus it has been shown that the invention provides a mapping sensor system for detecting, memorizing positions and thicknesses of flat objects and controlling movements of the robot arm. The mapping sensor system of the invention is reliable in operation, not sensitive to false signals, distinctly differentiates between empty and occupied slots of wafer cassettes, operates irrespective of the position of a notch or flat on the periphery of the semiconductor wafer, can operate with low-power laser light sources and hence without the use of intensified light signals dangerous for operator's health. The mapping sensor system of the aforementioned type operates with profiled light beams specifically modified for reflection from curvilinear peripheral edge of the wafer.

Although the invention has been shown and described with reference to specific embodiments, it is understood that these embodiments should not be construed as limiting the areas of application of the invention and that any changes and modifications are possible, provided these changes and modifications do not depart from the scope of the attached patent claims. For example, the system can operate with a light source of the type other than the laser diode, e.g., with LED. Different arrays of microlenses can be used for shaping the light beam. End effectors of the types different from the one shown in the drawings can be utilized for the purposes of the invention. Although the invention has been shown and described in connection with optical mapping of semiconductor wafers, the same principle is applicable to optical mapping of hard disks, glass substrates, or any other flat objects of circular or non-circular shape randomly arranged in recesses of a storage device and exposed to the light beam emitted from the mapping sensor. The aforementioned recesses or slots can be arranged in horizontal direction with vertical orientation of the flat objects in the slots.

What is claimed is:

1. A mapping sensor system for detecting positions of flat objects arranged randomly in recesses of a storage device, each of said flat objects having an edge, and a thickness, said mapping sensor system comprising:
a moveable carrier which is moveable with respect to said storage device across said flat objects and that rigidly supports a mapping sensor unit; and
memory means for recording data about said positions of said flat objects in said storage device and for controlling operation of said moveable carrier in accordance with said recorded data;
said mapping sensor unit comprising:
a light source that generates a light beam;
a beam shaper having means for transforming said light beam into a substantially flat light beam directed toward said flat objects substantially parallel to said flat objects and having a thickness in a cross section perpendicular to the direction of said flat light beam comparable with said thickness of said flat objects;
at least one light-receiving means for sensing a light beam reflected from said edge; and
an actuating mechanism with a control unit;
said at least one light receiving means having a sensitivity threshold lower than intensity of said light beam reflected from said edge but higher than a reflected light beam other than said light beam reflected from said edge;

said threshold being controlled and adjusted with the use of an electronic synchronous detection circuit.

2. The mapping sensor system of claim 1, wherein said each said flat objects has a structural feature which can be a source of false signal or absence of a signal generated by said mapping sensor system and wherein said reflected light beam other than said light beam reflected from said edge is a light beam selected from a beam reflected from said structural feature and a beam reflected from said storage device;

said threshold being controlled and adjusted with the use of an electronic synchronous detection circuit.

3. The mapping sensor system of claim 1, wherein said moveable carrier is an end effector of an industrial robot, said flat objects are semiconductor wafers, and said structural feature is a notch on said edge;

a protection of said substantially flat beam onto said edge being equal to or wider than said notch and wherein said means for transforming said light beam into a substantially flat light beam comprising at least one cylindrical lens:

said light source being a laser diode and said at least one light-receiving means being a photodiode;

said beam shaper comprising beam splitting means for splitting said light beam of said light source into a plurality of spaced individual beams directed towards said edge substantially parallel to said flat objects and having a thickness in a cross section perpendicular to the direction of said flat light beam comparable with said thickness of said flat objects, said mapping sensor system being further provided with a plurality of light-sensitive members in a number corresponding to the number of said individual beams and arranged on said moveable carrier so as to sense individual beams reflected from said edge in response to incidence of said individual beams emitted from said beam shaper;

said threshold being controlled and adjusted with the use of an electronic synchronous detection circuit.

4. The mapping sensor system of claim 3, wherein said beam splitting means comprises an array of at least two cylindrical microlenses, said mapping sensor unit being connected to memory means and generates an output signal sent to said actuating mechanism only when at least one of said light-sensitive members senses at least one of said individual beams reflected from said edge.

5. The mapping sensor system of claim 4, wherein each said light-sensitive members of said plurality has a sensitivity threshold lower than intensity of light beams reflected from said edge but higher than reflected light beams other than said light beams reflected from said edge.

6. The mapping sensor system of claim 5, wherein said each said flat objects has a structural feature which can be a source of false signal or absence of a signal generated by said mapping sensor system and wherein said reflected light beam other than said light beam reflected from said edge is a light beam selected from a beam reflected from said structural feature and a beam reflected from said storage device.

7. The mapping sensor system of claim 3, wherein said moveable carrier is an end effector of an industrial robot, said flat objects are semiconductor wafers, and said structural feature is a notch on said edge.

8. The mapping sensor system of claim 7, wherein a projection of said substantially flat beam onto said edge is equal to or wider than said notch.

9. The mapping sensor system of claim 8, wherein said light source is a laser diode and said at least one light-receiving means is a photodiode.

10. A mapping sensor system for detecting positions of flat objects arranged randomly in recesses of a storage device, each of said flat objects having an edge, and a thickness, said mapping sensor system comprising:

a moveable carrier which is moveable with respect to said storage device across said flat objects and that rigidly supports a mapping sensor unit; and memory means for recording data about said positions of said flat objects in said storage device and for controlling operation of said moveable carrier in accordance with said recorded data;

said mapping sensor unit comprising:
a light source that generates a light beam;
a beam shaper having means for transforming said light beam into a substantially flat light beam directed toward said flat objects substantially parallel to said flat objects and having a thickness in a cross section perpendicular to the direction of said flat light beam comparable with said thickness of said flat objects;
at least one light-receiving means for sensing a light beam reflected from said edge; and
an actuating mechanism with a control unit;

said at least one light receiving means having a sensitivity threshold lower than intensity of said light beam reflected from said edge but higher than a reflected light beam other than said light beam reflected from said edge;

said beam shaper unit comprising an anamorphotic objective consisting of a cylindrical lens and an array of cylindrical microlenses arranged on the optical path from said light source to said edge for splitting said light beam of said light source into a plurality of spaced individual beams directed towards said edge substantially parallel to said flat objects and having a thickness in a cross section perpendicular to the direction of said flat light beam comparable with said thickness of said flat objects, said system being further provided with a plurality of light-sensitive members in a number corresponding to the number of said individual beams and arranged on said moveable carrier so as to sense individual beams reflected from said edge in response to incidence of said individual beams emitted from said beam shaper.

11. The mapping sensor system of claim 10, wherein said threshold is controlled and adjusted with the use of an electronic synchronous detection circuit.

12. The mapping sensor system of claim 11, wherein each said light-sensitive member of said plurality has a sensitivity threshold lower than intensity of light beams reflected from said edge but higher than reflected light beams other than said light beams reflected from said edge.

13. A method of mapping a pattern of flat objects arranged randomly in recesses of a storage device, each of said flat objects having an edge, and a thickness, said method comprising:

providing a mapping sensor system having a moveable carrier that rigidly supports a mapping sensor unit and memory means for recording data about said positions of said flat objects in said storage device and for controlling operation of said moveable carrier in accordance with said recorded data, said mapping sensor unit comprising: a light source that generates a light beam; a beam shaper and at least one light-receiving means for sensing a light beam reflected from said edge;

moving said moveable carrier across said flat objects in said storage device;

sending a light beam from said light source to said beam shaper and transforming said light beam into at least one substantially flat beam having a thickness comparable with said thickness of said flat objects;

directing said substantially flat beam onto said edge of each of said flat objects;

detecting the presence of said flat objects in said positions in said storage device by sensing with said at least one light-receiving means a light beam reflected from said edge;

recording the position of each of said flat objects in said memory means when said light beam reflected from said edge is sensed by said at least one light-receiving means for obtaining mapping data; and controlling operation of said moveable carrier in accordance with said mapping data;

said at least one light receiving means having a sensitivity threshold lower than intensity of said light beam reflected from said edge but higher than intensity of a reflected light beam other than said light beam reflected from said edge;

said threshold being controlled and adjusted with the use of an electronic synchronous detection circuit.

14. A method of mapping a pattern of flat objects arranged randomly in recesses of a storage device, each of said flat objects having an edge, and a thickness, said method comprising:

providing a mapping sensor system having a moveable carrier that rigidly supports a mapping sensor unit and memory means for recording data about said positions of said flat objects in said storage device and for controlling operation of said moveable carrier in accordance with said recorded data, said mapping sensor unit comprising: a light source that generates a light beam; a beam shaper and a number of light-receiving means for sensing light beams reflected from said edge;

moving said moveable carrier across said flat objects in said storage device;

sending a light beam from said light source to said beam shaper and splitting said light beam into a plurality of substantially flat individual beams the number of which is equal to said number of said light-receiving means, said flat individual beams having a thickness comparable with said thickness of said flat objects;

directing said substantially flat beams onto said edge of each of said flat objects;

detecting the presence of said flat objects in said positions in said storage device by sensing with said light-receiving means at least one light beam reflected from said edge;

recording the position of each of said flat objects in said memory means when said at least one light beams reflected from said edge is sensed by said at least one light-receiving means for obtaining mapping data; and controlling operation of said moveable carrier in accordance with said mapping data;

said at least one light receiving means has a sensitivity threshold lower than intensity of said light beam reflected from said edge but higher than intensity of a reflected light beam other than said light beam reflected from said edge;

said each said flat objects having a structural feature which can be a source of false signal or absence of a signal generated by said mapping sensor system and wherein said reflected light beam other than said light beam reflected from said edge is a light beam selected from a beam reflected from said structural feature and a beam reflected from said storage device;

said threshold being controlled and adjusted with the use of an electronic synchronous detection circuit.

* * * * *